/ United States Patent / Gulati et al.

(10) Patent No.: US 11,677,453 B2
(45) Date of Patent: Jun. 13, 2023

(54) ENABLING GROUP LEADER- OR BASE STATION-BASED SIDELINK TRANSMIT POWER CONTROL AND RADIO LINK MANAGEMENT

(71) Applicant: QUALCOMM Incorporated, San Diego, CA (US)

(72) Inventors: Kapil Gulati, Belle Mead, NJ (US); Hong Cheng, Basking Ridge, NJ (US); Sony Akkarakaran, Poway, CA (US); Jung Ho Ryu, Fort Lee, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/217,878

(22) Filed: Mar. 30, 2021

(65) Prior Publication Data

US 2021/0306054 A1    Sep. 30, 2021

Related U.S. Application Data

(60) Provisional application No. 63/003,121, filed on Mar. 31, 2020.

(51) Int. Cl.
H04B 7/06      (2006.01)
H04W 76/19    (2018.01)
(Continued)

(52) U.S. Cl.
CPC ......... *H04B 7/0695* (2013.01); *H04L 1/0003* (2013.01); *H04W 16/28* (2013.01);
(Continued)

(58) Field of Classification Search
CPC ... H04B 7/0695; H04B 17/318; H04L 1/0003; H04W 16/28; H04W 52/265;
(Continued)

(56) References Cited

U.S. PATENT DOCUMENTS

2016/0262034 A1*  9/2016  Gulati ............... H04B 17/29
2018/0013685 A1*  1/2018  Yu ..................... H04L 43/0829

FOREIGN PATENT DOCUMENTS

EP    3206321 A1    8/2017

OTHER PUBLICATIONS

ETSI TS 136 321:"LTE;Evolved Universal Terrestrial Radio Access(E-UTRA);Medium Access Control(MAC)Protocol Specification(3GPP TS36.321 version 15.8.0 Release 15)",ETSI Technical Spec,European Telecommunications Standards Institute(ETSI).650.Route Des Lucioles,F-06921 Sophia-Antipolis,France, vol. 3GPP RAN. No. V15.8.0, Jan. 17, 2020(Jan. 17, 2020),pp. 1-137,XP014360448,137 Pgs,Retrieved from the Internet:URL:http://www.etsi.org/deliver/etsi_ts/136300_136399/136321/15.08.00_60/ts/136321v150800p. pdf retrieved on Jan. 17, 2020] Paras [5.1.1]-[07.1].
(Continued)

Primary Examiner — Eric Myers
(74) Attorney, Agent, or Firm — Muncy, Geissler, Olds and Lowe

(57) ABSTRACT

Disclosed are techniques for wireless communication. In an aspect, a user equipment (UE) participating in a sidelink communications group increments a transmit counter for each packet transmitted by the first UE as part of group communications among the sidelink communications group, increments a receive counter for each packet received by the first UE from a second UE participating in the sidelink communications group as part of group communications among the sidelink communications group; and transmits the transmit counter and the receive counter to a network
(Continued)

node based on a configuration received from the network node.

14 Claims, 10 Drawing Sheets

(51) Int. Cl.
*H04L 1/00* (2006.01)
*H04W 52/26* (2009.01)
*H04W 16/28* (2009.01)
*H04W 92/18* (2009.01)

(52) U.S. Cl.
CPC ......... *H04W 52/265* (2013.01); *H04W 76/19* (2018.02); *H04W 92/18* (2013.01)

(58) Field of Classification Search
CPC . H04W 76/19; H04W 92/18; H04W 28/0268; H04W 40/22; H04W 28/0958; H04W 52/262; H04W 4/08; H04W 4/40; H04W 52/42; H04W 76/14; Y02D 30/70
See application file for complete search history.

(56) References Cited

OTHER PUBLICATIONS

International Search Report and Written Opinion—PCT/US2021/025194—ISA/EPO—dated Jul. 6, 2021.

\* cited by examiner ed counter, whether or not there is a mismatch between the transmit counter and the receive counter, and, based on the mismatch between the transmit counter and the receive counter, cause the at least one transceiver to transmit, to at least the first UE, a command to reestablish a sidelink with the second UE.

ENABLING GROUP LEADER- OR BASE STATION-BASED SIDELINK TRANSMIT POWER CONTROL AND RADIO LINK MANAGEMENT

CROSS-REFERENCE TO RELATED APPLICATIONS

The present Application for Patent claims the benefit of U.S. Provisional Application No. 63/003,121, entitled "ENABLING GROUP LEADER—OR BASE STATION-BASED SIDELINK TRANSMIT POWER CONTROL AND RADIO LINK MANAGEMENT," filed Mar. 31, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for wireless communication performed by a first UE participating in a sidelink communications group includes incrementing a transmit counter for each packet transmitted by the first UE as part of group communications among the sidelink communications group, incrementing a receive counter for each packet received by the first UE from a second UE participating in the sidelink communications group as part of group communications among the sidelink communications group, and transmitting the transmit counter and the receive counter to a network node based on a configuration received from the network node.

In an aspect, a method for wireless communication performed by a network node associated with a sidelink communications group includes receiving, from a first UE participating in the sidelink communications group, a transmit counter indicating a number of packets transmitted by the first UE as part of group communications among the sidelink communications group, receiving, from a second UE participating in the sidelink communications group, a receive counter indicating a number of packets received by the second UE from the first UE as part of group communications among the sidelink communications group, determining, based on the transmit counter and the receive counter, whether or not there is a mismatch between the transmit counter and the receive counter, and, based on the mismatch between the transmit counter and the receive counter, transmitting, to at least the first UE, a command to reestablish a sidelink with the second UE.

In an aspect, a first UE participating in a sidelink communications group includes a memory, a communication interface, and at least one processor communicatively coupled to the memory and the communication interface, the at least one processor configured to: increment a transmit counter for each packet transmitted by the first UE as part of group communications among the sidelink communications group, increment a receive counter for each packet received by the first UE from a second UE participating in the the sidelink communications group as part of group communications among the sidelink communications group, and cause the at least one transceiver to transmit the transmit counter and the receive counter to a network node based on a configuration received from the network node.

In an aspect, a network node associated with a sidelink communications group includes a memory, communication interface, and at least one processor communicatively coupled to the memory and the communication interface, the at least one processor configured to: receive, from a first UE participating in the sidelink communications group, via the at least one transceiver, a transmit counter indicating a number of packets transmitted by the first UE as part of group communications among the sidelink communications group, receive, from a second UE participating in the sidelink communications group, via the at least one transceiver, a receive counter indicating a number of packets received by the second UE from the first UE as part of group communications among the sidelink communications group, determine, based on the transmit counter and the receive counter, whether or not there is a mismatch between the transmit counter and the receive counter, and cause the at least one transceiver to transmit, to at least the first UE, based on the mismatch between the transmit counter and the receive counter, a command to reestablish a sidelink with the second UE.

In an aspect, a first UE participating in a sidelink communications group includes means for incrementing a transmit counter for each packet transmitted by the first UE as part of group communications among the sidelink communications group, means for incrementing a receive counter for each packet received by the first UE from a second UE participating in the the sidelink communications group as part of group communications among the sidelink communications group, and means for transmitting the transmit counter and the receive counter to a network node based on a configuration received from the network node.

In an aspect, a network node associated with a sidelink communications group includes means for receiving, from a first UE participating in the sidelink communications group, a transmit counter indicating a number of packets transmitted by the first UE as part of group communications among the sidelink communications group, means for receiving, from a second UE participating in the sidelink communications group, a receive counter indicating a number of packets received by the second UE from the first UE as part of group communications among the sidelink communications group, means for determining, based on the transmit counter and the receive counter, whether or not there is a mismatch between the transmit counter and the receive counter, and means for transmitting, to at least the first UE, based on the mismatch between the transmit counter and the receive counter, a command to reestablish a sidelink with the second UE.

In an aspect, a non-transitory computer-readable medium storing computer-executable instructions includes computer-executable instructions comprising at least one instruction instructing a first UE participating in a sidelink communications group to increment a transmit counter for each packet transmitted by the first UE as part of group communications among the sidelink communications group, at least one instruction instructing the first UE to increment a receive counter for each packet received by the first UE from a second UE participating in the sidelink communications group as part of group communications among the sidelink communications group, and at least one instruction instructing the first UE to transmit the transmit counter and the receive counter to a network node based on a configuration received from the network node.

In an aspect, a non-transitory computer-readable medium storing computer-executable instructions includes computer-executable instructions comprising at least one instruction instructing a network node to receive, from a first UE participating in a sidelink communications group, a transmit counter indicating a number of packets transmitted by the first UE as part of group communications among the sidelink communications group, at least one instruction instructing the network node to receive, from a second UE participating in the sidelink communications group, a receive counter indicating a number of packets received by the second UE from the first UE as part of group communications among the sidelink communications group, at least one instruction instructing the network node to determine, based on the transmit counter and the receive counter, whether or not there is a mismatch between the transmit counter and the receive counter, and at least one instruction instructing the network node to transmit, to at least the first UE, based on the mismatch between the transmit counter and the receive counter, a command to reestablish a sidelink with the second UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
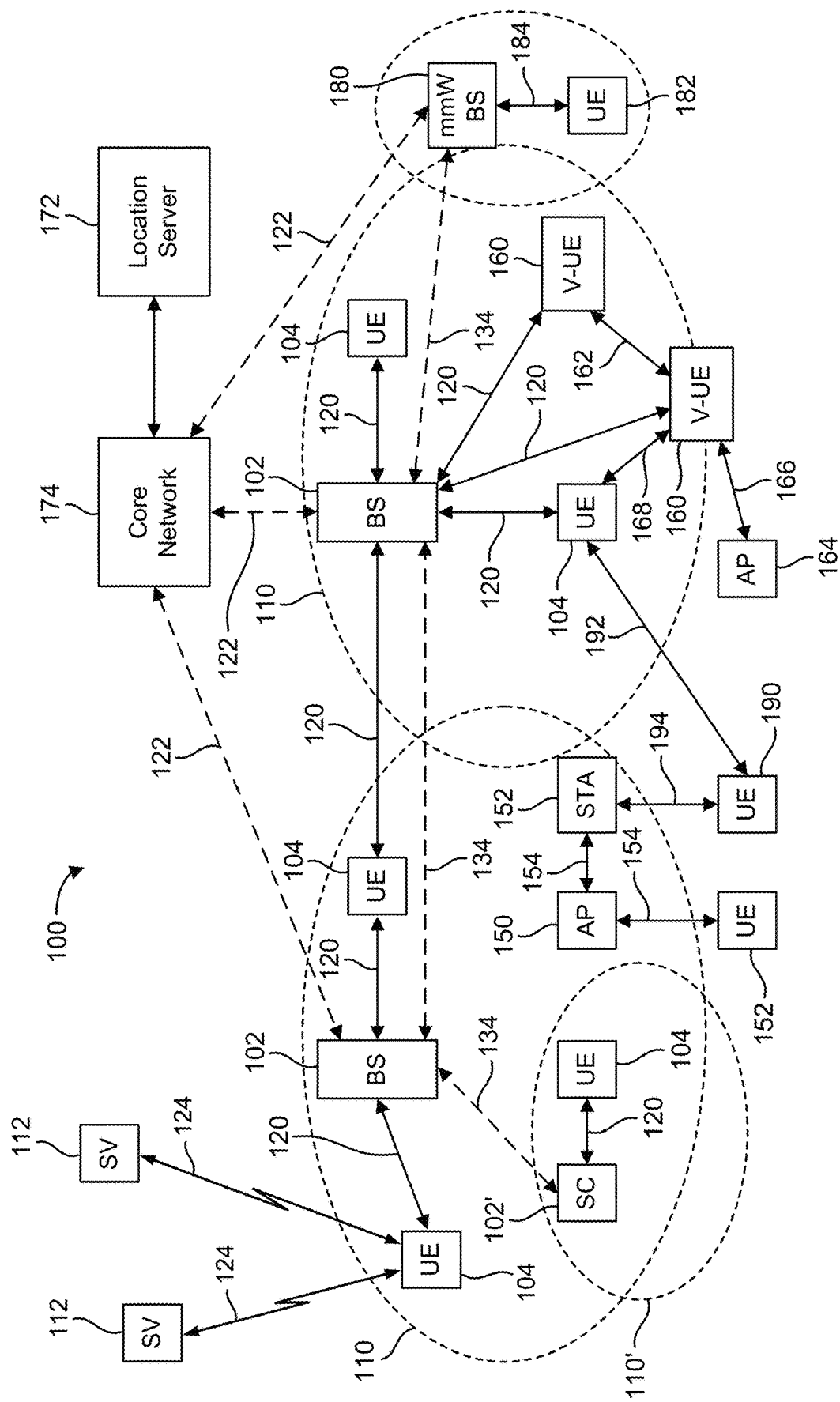
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
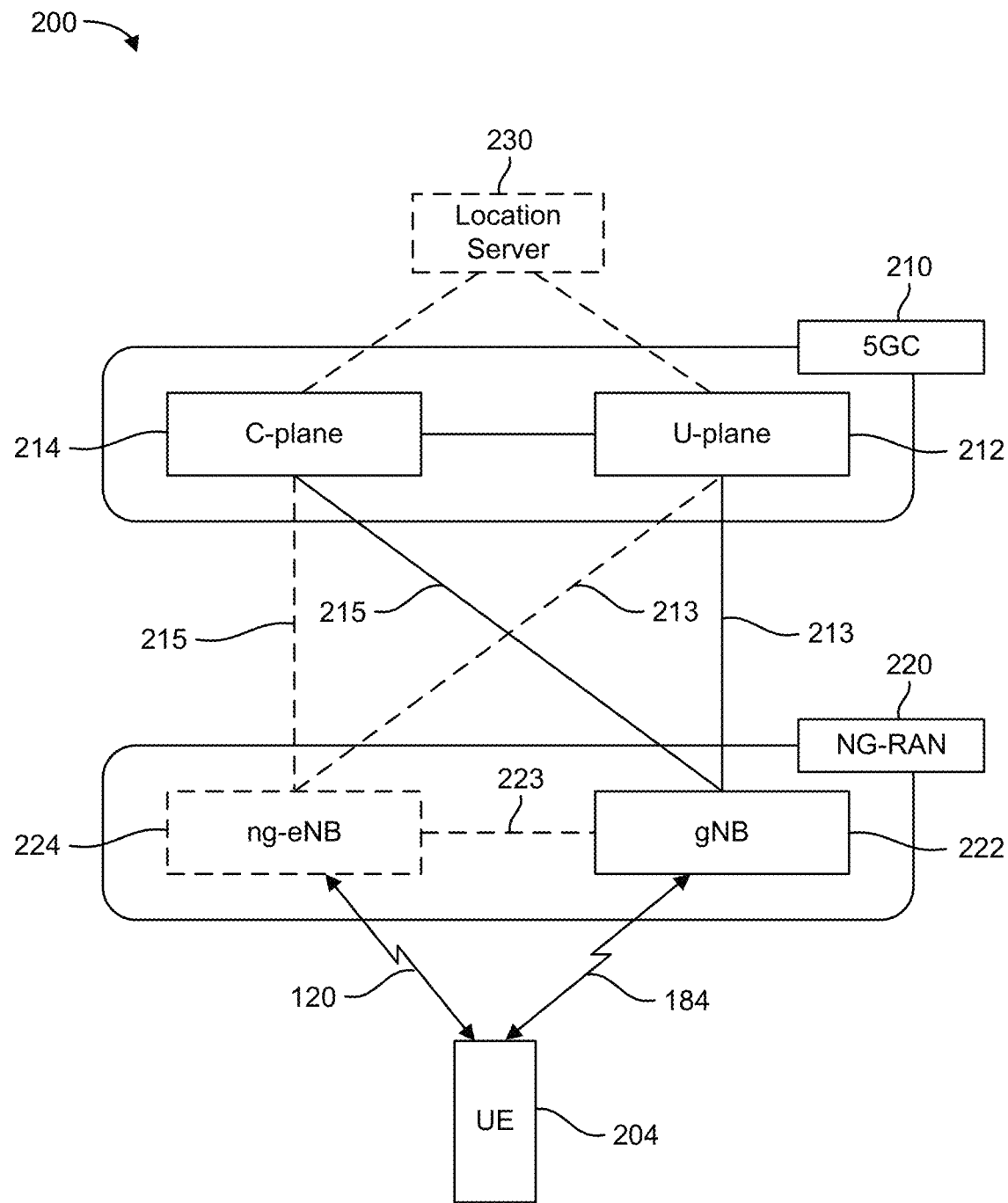
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
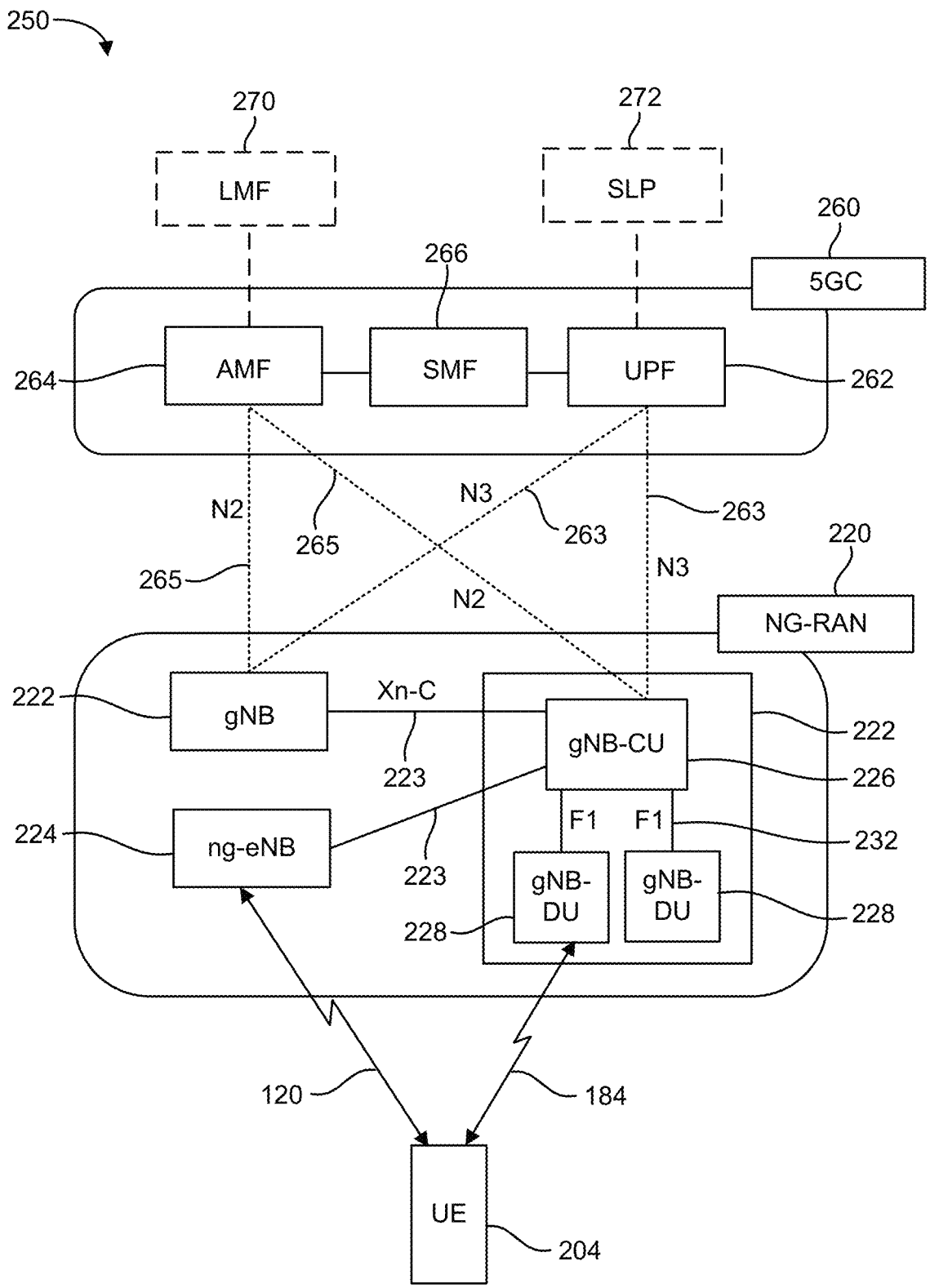

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3:
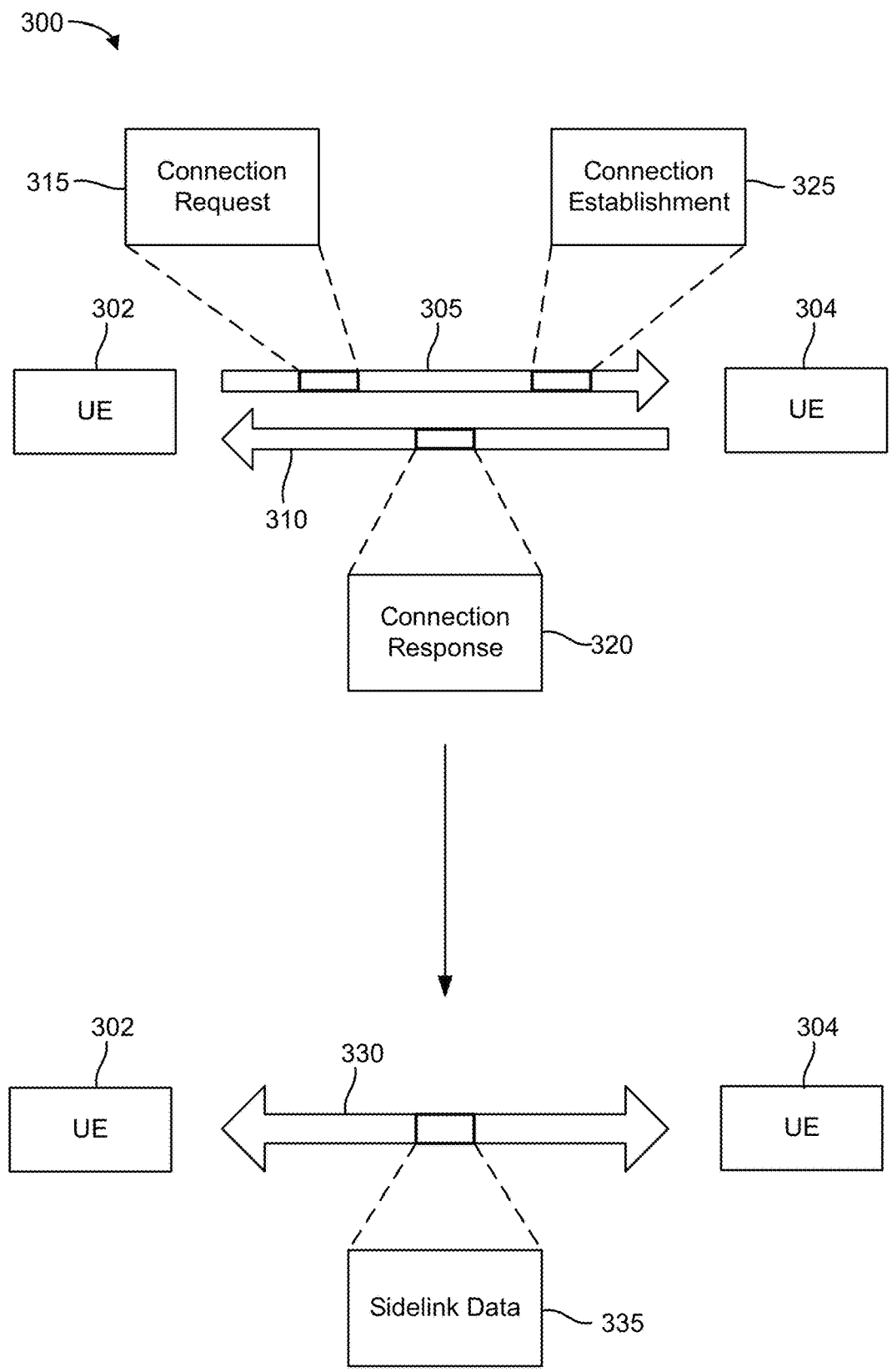
FIG. 3 illustrates an example of a wireless communications system that supports unicast sidelink establishment, according to aspects of the disclosure.

FIG. 3 illustrates an example of a wireless communications system 300 that supports wireless unicast sidelink establishment, according to aspects of the disclosure. In some examples, wireless communications system 300 may implement aspects of wireless communications systems 100, 200, and 250. Wireless communications system 300 may include a first UE 302 and a second UE 304, which may be examples of any of the UEs described herein. As specific examples, UEs 302 and 304 may correspond to V-UEs 160 in FIG. 1, UE 190 and UE 104 in FIG. 1 connected over D2D P2P link 192, or UEs 204 in FIGS. 2A and 2B.

In the example of FIG. 3, the UE 302 may attempt to establish a unicast connection over a sidelink with the UE 304, which may be a V2X sidelink between the UE 302 and UE 304. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 302 may be referred to as an initiating UE that initiates the sidelink connection procedure, and the UE 304 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 302 and UE 304. For example, a transmission and reception capability matching may be negotiated between the UE 302 and UE 304. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 302 and UE 304.

In some cases, UE 304 may create a service announcement (e.g., a service capability message) to transmit over a cellular network (e.g., cV2X) to assist the sidelink connection establishment. Conventionally, UE 302 may identify and locate candidates for sidelink communications based on a basic service message (BSM) broadcasted unencrypted by nearby UEs (e.g., UE 304). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 302 is able to detect the BSM(s). Accordingly, the service announcement transmitted by UE 304 and other nearby UEs (e.g., a discovery signal) may be an upper layer signal and broadcasted (e.g., in an NR sidelink broadcast). In some cases, the UE 304 may include one or more parameters for itself in the service announcement, including connection parameters and/or capabilities it possesses. The UE 302 may then monitor for and receive the broadcasted service announcement to identify potential UEs for corresponding sidelink connections. In some cases, the UE 302 may identify the potential UEs based on the capabilities each UE indicates in their respective service announcements.

The service announcement may include information to assist the UE 302 (e.g., or any initiating UE) to identify the UE transmitting the service announcement (UE 304 in the example of FIG. 3). For example, the service announcement may include channel information where direct communication requests may be sent. In some cases, the channel information may be RAT-specific (e.g., specific to LTE or NR) and may include a resource pool within which UE 302 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 304 in the example of FIG. 3), the initiating UE (UE 302 in the example of FIG. 3) may transmit a connection request 315 to the identified target UE 304. In some cases, the connection request 315 may be a first RRC message transmitted by the UE 302 to request a unicast connection with the UE 304 (e.g., an "RRCDirectConnectionSetupRequest" message). For example, the unicast connection may utilize the PC5 interface for the sidelink, and the connection request 315 may be an RRC connection setup request message. Additionally, the UE 302 may use a sidelink signaling radio bearer 305 to transport the connection request 315.

After receiving the connection request 315, the UE 304 may determine whether to accept or reject the connection request 315. The UE 304 may base this determination on a transmission/reception capability, an ability to accommodate the unicast connection over the sidelink, a particular service indicated for the unicast connection, the contents to be transmitted over the unicast connection, or a combination thereof. For example, if the UE 302 wants to use a first RAT to transmit or receive data, but the UE 304 does not support the first RAT, then the UE 304 may reject the connection request 315. Additionally or alternatively, the UE 304 may reject the connection request 315 based on being unable to accommodate the unicast connection over the sidelink due to limited radio resources, a scheduling issue, etc. Accordingly, the UE 304 may transmit an indication of whether the request is accepted or rejected in a connection response 320. Similar to the UE 302 and the connection request 315, the UE 304 may use a sidelink signaling radio bearer 310 to transport the connection response 320. Additionally, the connection response 320 may be a second RRC message transmitted by the UE 304 in response to the connection request 315 (e.g., an "RRCDirectConnectionResponse" message).

In some cases, sidelink signaling radio bearers 305 and 310 may be the same sidelink signaling radio bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 320 indicates that the UE 304 accepted the connection request 315, the UE 302 may then transmit a connection establishment 325 message on the sidelink signaling radio bearer 305 to indicate that the unicast connection setup is complete. In some cases, the connection establishment 325 may be a third RRC message (e.g., an "RRCDirectConnectionSetupComplete" message). Each of the connection request 315, the connection response 320, and the connection establishment 325 may use a basic capability when being transported from one UE to the other UE to enable each UE to be able to receive and decode the corresponding transmission (e.g., the RRC messages).

Additionally, identifiers may be used for each of the connection request 315, the connection response 320, and the connection establishment 325. For example, the identifiers may indicate which UE 302/304 is transmitting which message and/or for which UE 302/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, the UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 302 and/or UE 304 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 302 and/or UE 304 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 302 and/or UE 304 may include PHY layer parameters when establishing the unicast connection to set a PHY layer context for the unicast connection. For example, the PHY layer context may indicate a transmission format (unless transmission profiles are included for each UE 302/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 325 message is transmitted). Before a security association (e.g., security context) is established between the UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 304 may base its decision on whether to accept or reject the connection request 315 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 302 and UE 304 may communicate using the unicast connection over a sidelink 330, where sidelink data 335 is transmitted between the two UEs 302 and 304. The sidelink 330 may correspond to sidelinks 162 and/or 168 in FIG. 1. In some cases, the sidelink data 335 may include RRC messages transmitted between the two UEs 302 and 304. To maintain this unicast connection on sidelink 330, UE 302 and/or UE 304 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 302 or by both UE 302 and UE 304. Additionally or alternatively, a MAC control element (CE) (e.g., defined over sidelink 330) may be used to monitor the status of the unicast connection on sidelink 330 and maintain the connection. When the unicast connection is no longer needed (e.g., UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4A:
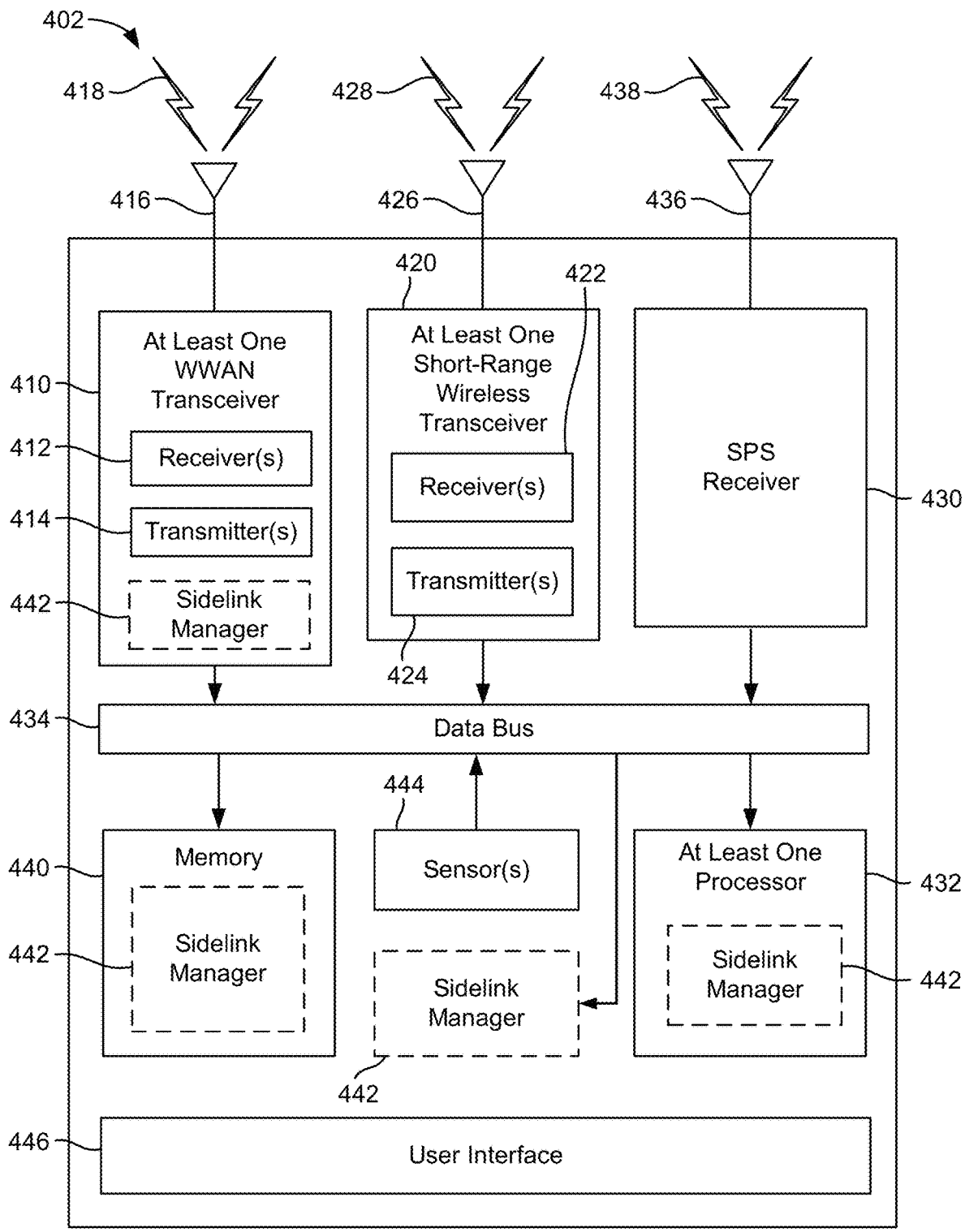
FIGS. 4A, 4B, and 4C are simplified block diagrams of several sample aspects of components that may be employed in a user equipment (UE), a base station, and a network entity, respectively, and configured to support communications as taught herein.
Figure 4B:
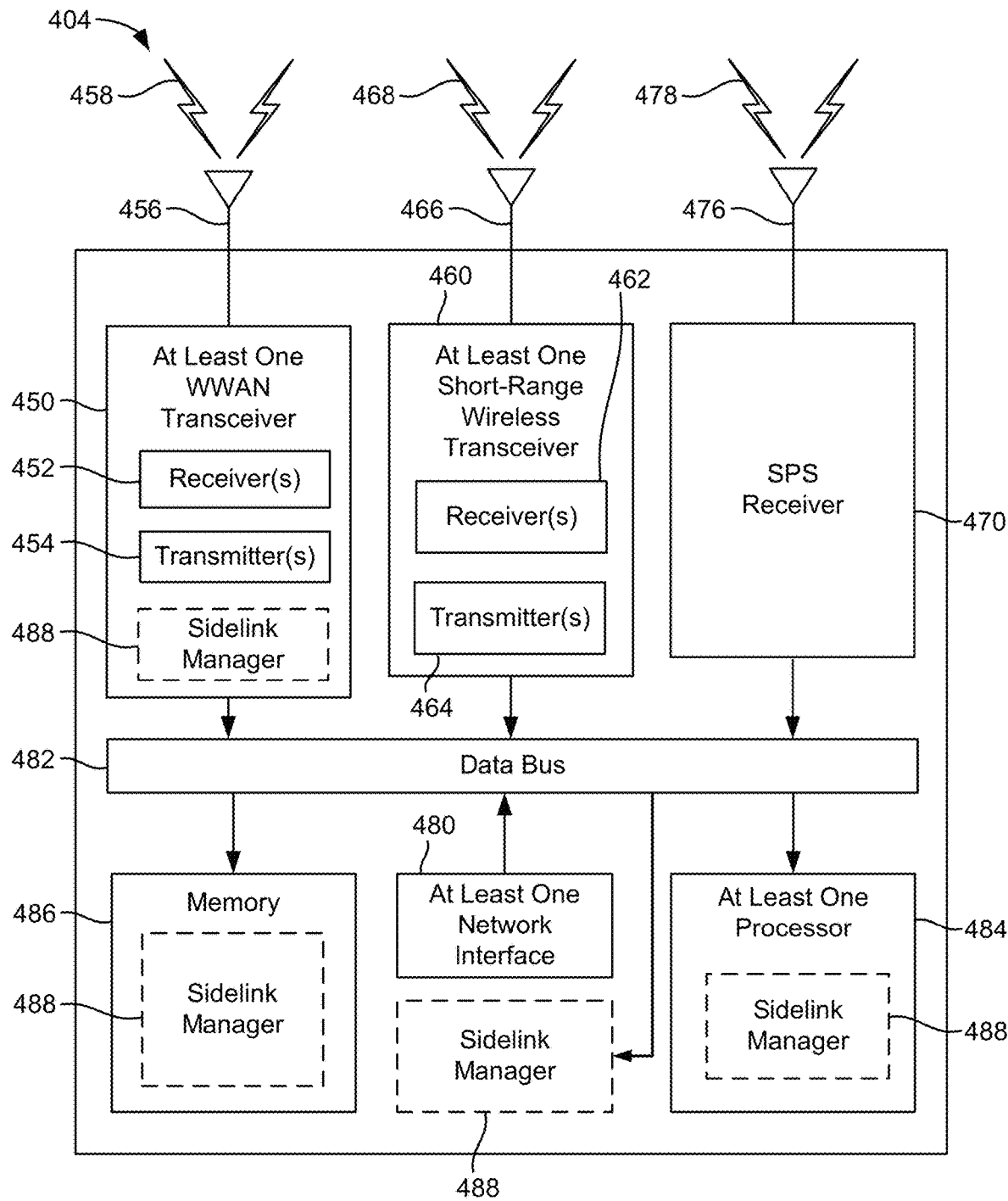
Figure 4C:
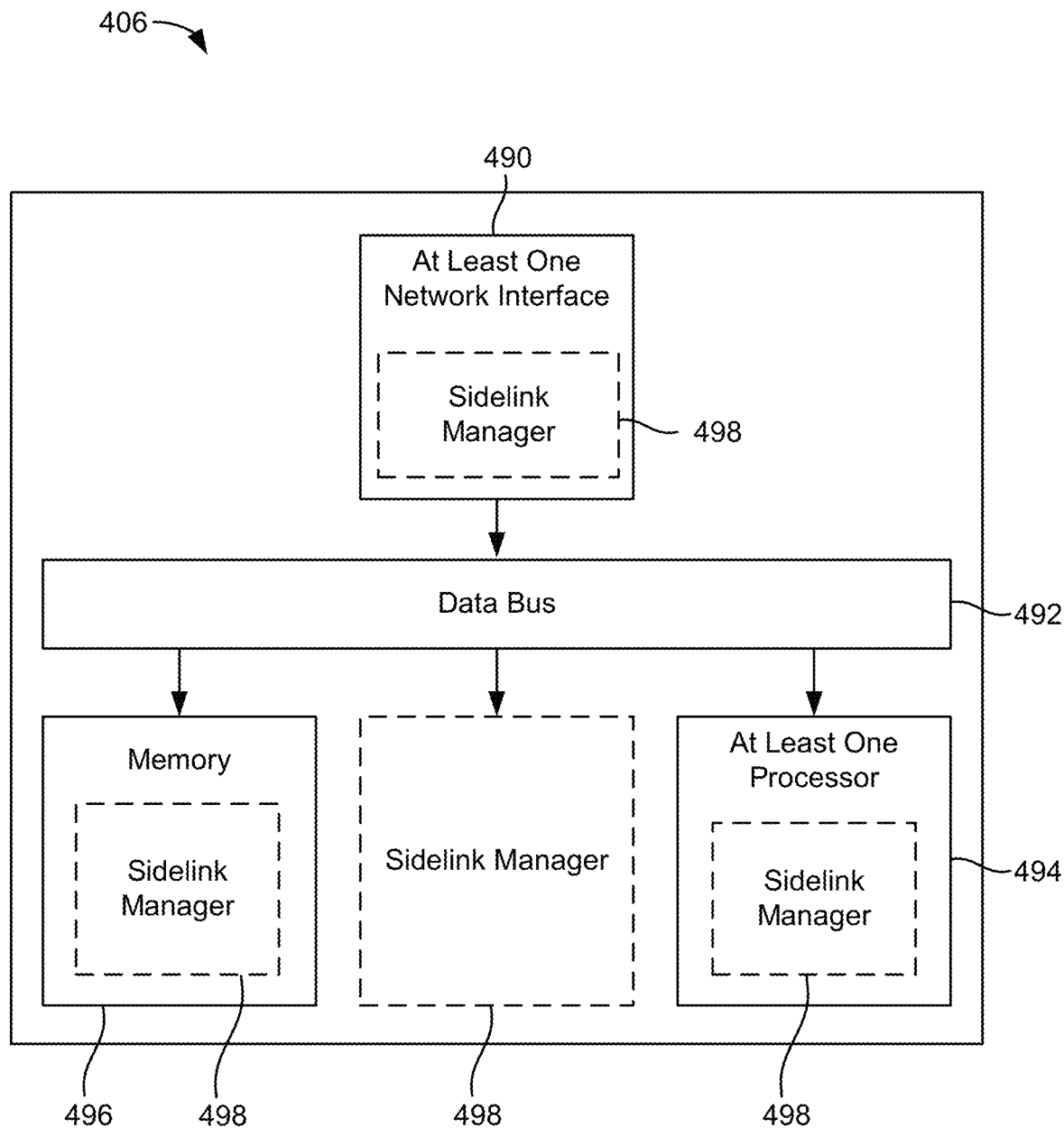

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include at least one wireless wide area network (WWAN) transceiver 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 each also include, at least in some cases, at least one short-range wireless transceiver 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 416, 426, 456, 466), such as an antenna array, that permits the respective apparatus to perform transmit "beamforming," as described herein. Similarly, a receiver may include or be coupled to a plurality of antennas (e.g., antennas 416, 426, 456, 466), such as an antenna array, that permits the respective apparatus to perform receive beamforming, as described herein. In an aspect, the transmitter and receiver may share the same plurality of antennas (e.g., antennas 416, 426, 456, 466), such that the respective apparatus can only receive or transmit at a given time, not both at the same time. A wireless communication device (e.g., one or both of the transceivers 410 and 420 and/or 450 and 460) of the UE 402 and/or the base station 404 may also comprise a network listen module (NLM) or the like for performing various measurements.

The UE 402 and the base station 404 also include, at least in some cases, satellite positioning systems (SPS) receivers 430 and 470. The SPS receivers 430 and 470 may be connected to one or more antennas 436 and 476, respectively, and may provide means for receiving and/or measuring SPS signals 438 and 478, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 430 and 470 may comprise any suitable hardware and/or software for receiving and processing SPS signals 438 and 478, respectively. The SPS receivers 430 and 470 request information and operations as appropriate from the other systems, and performs calculations necessary to determine positions of the UE 402 and the base station 404 using measurements obtained by any suitable SPS algorithm.

The base station 404 and the network entity 406 each include at least one network interface 480 and 490, respectively, providing means for communicating (e.g., means for transmitting, means for receiving, etc.) with other network entities. For example, the network interfaces 480 and 490 (e.g., one or more network access ports) may be configured to communicate with one or more network entities via a wire-based or wireless backhaul connection. In some aspects, the network interfaces 480 and 490 may be implemented as transceivers configured to support wire-based or wireless signal communication. This communication may involve, for example, sending and receiving messages, parameters, and/or other types of information.

In an aspect, the at least one WWAN transceiver 410 and/or the at least one short-range wireless transceiver 420 may form a (wireless) communication interface of the UE 402. Similarly, the at least one WWAN transceiver 450, the at least one short-range wireless transceiver 460, and/or the at least one network interface 480 may form a (wireless) communication interface of the base station 404. Likewise, the at least one network interface 490 may form a (wireless) communication interface of the network entity 406. The various wireless transceivers (e.g., transceivers 410, 420, 450, and 460) and wired transceivers (e.g., network interfaces 480 and 490) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 402, the base station 404, and the network entity 406 also include other components that may be used in conjunction with the operations as disclosed herein. The UE 402, the base station 404, and the network entity 406 include at least one processor 432, 484, and 494, respectively, for providing functionality relating to, for example, wireless communication, and for providing other processing functionality. The processors 432, 484, and 494 may therefore provide means for processing, such as means for determining, means for calculating, means for receiving, means for transmitting, means for indicating, etc. In an aspect, the processors 432, 484, and 494 may include, for example, at least one general purpose processor, multi-core processor, central processing unit (CPU), ASIC, digital signal processor (DSP), field programmable gate array (FPGA), other programmable logic devices or processing circuitry, or various combinations thereof.

The UE 402, the base station 404, and the network entity 406 include memory circuitry implementing memory components 440, 486, and 496 (e.g., each including a memory device), respectively, for maintaining information (e.g., information indicative of reserved resources, thresholds, parameters, and so on). The memory components 440, 486, and 496 may therefore provide means for storing, means for retrieving, means for maintaining, etc. In some cases, the UE 402, the base station 404, and the network entity 406 may include sidelink managers 442, 488, and 498, respectively. The sidelink managers 442, 488, and 498 may be hardware circuits that are part of or coupled to the processors 432, 484, and 494, respectively, that, when executed, cause the UE 402, the base station 404, and the network entity 406 to perform the functionality described herein. In other aspects, the sidelink managers 442, 488, and 498 may be external to the processors 432, 484, and 494 (e.g., part of a modem processing system, integrated with another processing system, etc.). Alternatively, the sidelink managers 442, 488, and 498 may be memory modules stored in the memory components 440, 486, and 496, respectively, that, when executed by the processors 432, 484, and 494 (or a modem processing system, another processing system, etc.), cause the UE 402, the base station 404, and the network entity 406 to perform the functionality described herein. FIG. 4A illustrates possible locations of the sidelink manager 442, which may be, for example, part of the at least one WWAN transceiver 410, the memory component 440, the at least one processor 432, or any combination thereof, or may be a standalone component. FIG. 4B illustrates possible locations of the sidelink manager 488, which may be, for example, part of the at least one WWAN transceiver 450, the memory component 486, the at least one processor 484, or any combination thereof, or may be a standalone component. FIG. 4C illustrates possible locations of the sidelink manager 498, which may be, for example, part of the at least one network interface 490, the memory component 496, the at least one processor 494, or any combination thereof, or may be a standalone component.

The UE 402 may include one or more sensors 444 coupled to the at least one processor 432 to provide means for sensing or detecting movement and/or orientation information that is independent of motion data derived from signals received by the at least one WWAN transceiver 410, the at least one short-range wireless transceiver 420, and/or the SPS receiver 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in two-dimensional (2D) and/or three-dimensional (3D) coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the at least one processor 484 in more detail, in the downlink, IP packets from the network entity 406 may be provided to the at least one processor 484. The at least one processor 484 may implement functionality for an RRC layer, a packet data convergence protocol (PDCP) layer, a radio link control (RLC) layer, and a medium access control (MAC) layer. The at least one processor 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the at least one processor 432. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the at least one processor 432, which implements Layer-3 (L3) and Layer-2 (L2) functionality.

In the uplink, the at least one processor 432 provides demultiplexing between transport and logical channels, packet reassembly, deciphering, header decompression, and control signal processing to recover IP packets from the core network. The at least one processor 432 is also responsible for error detection.

Similar to the functionality described in connection with the downlink transmission by the base station 404, the at least one processor 432 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the at least one processor 484.

In the uplink, the at least one processor 484 provides demultiplexing between transport and logical channels, packet reassembly, deciphering, header decompression, control signal processing to recover IP packets from the UE 402. IP packets from the at least one processor 484 may be provided to the core network. The at least one processor 484 is also responsible for error detection.

For convenience, the UE 402, the base station 404, and/or the network entity 406 are shown in FIGS. 4A, 4B, and 4C as including various components that may be configured according to the various examples described herein. It will be appreciated, however, that the illustrated components may have different functionality in different designs.

The various components of the UE 402, the base station 404, and the network entity 406 may communicate with each other over data buses 434, 482, and 492, respectively. In an aspect, the data buses 434, 482, and 492 may form, or be part of, the communication interface of the UE 402, the base station 404, and the network entity 406, respectively. For example, where different logical entities are embodied in the same device (e.g., gNB and location server functionality incorporated into the same base station 404), the data buses 434, 482, and 492 may provide communication between them.

The components of FIGS. 4A, 4B, and 4C may be implemented in various ways. In some implementations, the components of FIGS. 4A, 4B, and 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processors 432, 484, 494, the transceivers 410, 420, 450, and 460, the memory components 440, 486, and 496, the sidelink managers 442, 488, and 498, etc.

In some designs, the network entity 406 may be implemented as a core network component. In other designs, the network entity 406 may be distinct from a network operator or operation of the cellular network infrastructure (e.g., NG RAN 220 and/or 5GC 210/260). For example, the network entity 406 may be a component of a private network that may be configured to communicate with the UE 402 via the base station 404 or independently from the base station 404 (e.g., over a non-cellular communication link, such as WiFi).

Figure 5:
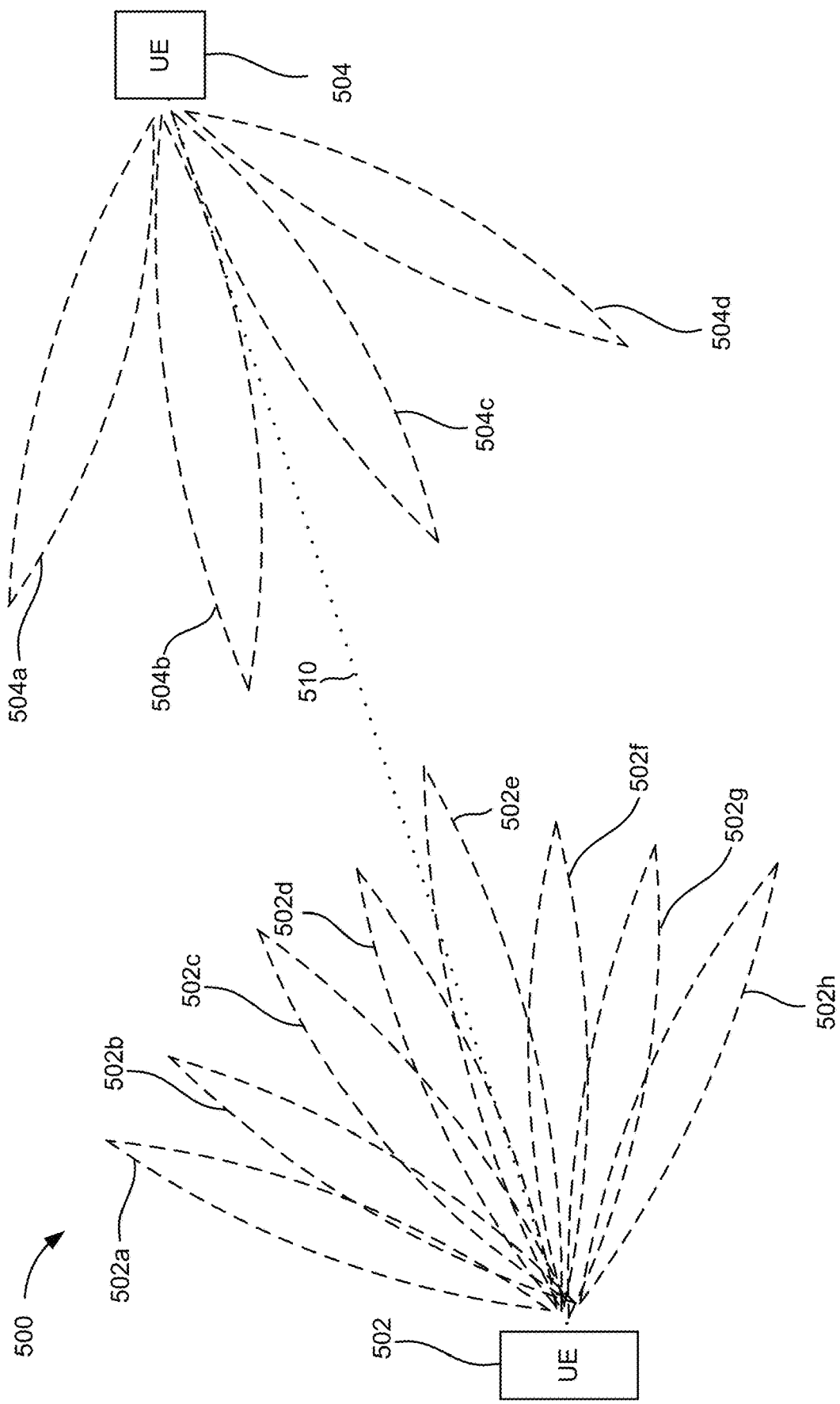
FIG. 5 is a diagram illustrating an example base station in communication with an example UE, according to aspects of the disclosure.

As noted above, the sidelink communications between UEs may employ beamforming at mmW or near mmW frequencies to, for example, increase data transfer rates between the UEs. The use of mmW frequencies may be in addition to microwave frequencies (e.g., in the "sub-6" GHz, or FR1, band) that may also be supported for use in sidelink communication, such as group discovery messages. FIG. 5 is a diagram 500 illustrating an example UE 502 (which may correspond to any of the UEs described herein) in communication with an example UE 504 (which may correspond to any of the UEs described herein), according to various aspects of the disclosure. The UEs 502 and 504 may be members of a sidelink communications group, and may be attempting to establish a sidelink (e.g., sidelink 162 or 168 in FIG. 1, sidelink 330 in FIG. 3) between themselves. Referring to FIG. 5, the UE 502 may transmit a beamformed signal to the UE 504 on one or more transmit beams 502*a*, 502*b*, 502*c*, 502*d*, 502*e*, 502*f*, 502*g*, 502*h*. For example, where the UE 502 is beamforming towards the UE 504 with a single array of antennas, the UE 502 may perform a "beam sweep" by transmitting first beam 502*a*, then beam 502*b*, and so on until lastly transmitting beam 502*h*. Alternatively, the UE 502 may transmit beams 502*a*-502*h* in some pattern, such as beam 502*a*, then beam 502*h*, then beam 502*b*, then beam 502*g*, and so on. Where the UE 502 is beamforming towards the UE 504 using multiple arrays of antennas, each antenna array may perform a beam sweep of a subset of the beams 502*a*-502*h*. Alternatively, each of beams 502*a*-502*h* may correspond to a single antenna or antenna array.

The UE 504 may receive the beamformed signal from the UE 502 on one or more receive beams 504*a*, 504*b*, 504*c*, 504*d*. Note that for simplicity, the beams illustrated in FIG. 5 represent either transmit beams or receive beams, depending on which of the UE 502 and the UE 504 is transmitting and which is receiving. Thus, the UE 504 may transmit a beamformed signal to the UE 502 on one or more of the beams 504*a*-504*d*, and the UE 502 may receive the beamformed signal from the UE 504 on one or more of the beams 502*a*-502*h*.

The UE 502 and the UE 504 may perform beam training to determine the best receive and transmit beams for each of the UE 502 and the UE 504. For example, depending on environmental conditions and other factors, the UE 502 and the UE 504 may determine that the best transmit and receive beams are 502*d* and 504*b*, respectively, or beams 502*e* and 504*c*, respectively. The direction of the best transmit beam for the UE 502 may or may not be the same as the direction of the best receive beam, and likewise, the direction of the best receive beam for the UE 504 may or may not be the same as the direction of the best transmit beam.

The UE 502 may transmit reference signals to the UE 504 on multiple beams, with each beam having different weights. The different weights of the beams will result in different received signal strengths (e.g., RSRP, RSRQ, SINR, etc.) at the UE 504. Further, the channel energy response (CER) will be smaller for transmit beams that are further from the line of sight (LOS) path between the UE 502 and the UE 504 than for transmit beams that are closer to the LOS path. Likewise, the received signal strength will be lower for transmit beams that are further from the LOS path than for transmit beams that are closer to the LOS path.

In the example of FIG. 5, the LOS path between the UE 502 and the UE 504 is represented as LOS path 510. If the UE 502 transmits reference signals to the UE 504 on beams 502*c*, 502*d*, 502*e*, then transmit beam 502*d* is best aligned with the LOS path 510, while transmit beams 502*c* and 502*e* are not. As such, beam 502*d* will have a stronger CER and higher received signal strength than beams 502*c* and 502*e*. The UE 504 can report the CER and received signal strength of each measured transmit beam to the UE 502, or alternatively, the identity of the transmit beam having the strongest CER and highest received signal strength.

For sidelink communications among two or more UEs, it is sometimes necessary for a transmitting UE to either increase or decrease its transmit power to improve hearability of the transmitted signal(s) at the receiving UE(s). This is known as transmit power control (TPC). Transmit power may be increased to meet a threshold signal strength at the receiver, or decreased to minimize interference with other transmitters using the frequency spectrum. There are two types of transmit power control, open loop and closed loop. In open loop transmit power control, the transmitting UE determines its transmission power using its own power setting algorithm. There is no feedback input from the receiver. In closed loop transmit power control, the transmitting UE uses feedback from the receiving UE(s) to determine its transmission power. In some cases, the receiving UE may specifically request a certain transmit power. Open loop transmit power control may be used during connection establishment, before the receiving UE(s) can provide feedback to the transmitting UE. Once a sidelink has been established (e.g., as illustrated in FIG. 3), closed loop power control can be used.

As noted above, groups of UEs (e.g., V-UEs 160 in FIG. 1, UEs 204 in FIG. 2, UEs 302 and 304 in FIG. 3, UEs 502 and 504 in FIG. 5) may communicate over a sidelink (e.g., sidelink 162 or 168 in FIG. 1, sidelink 330 in FIG. 3). If closed/open loop transmit power control is employed for sidelink group communications, the UEs in the group settle (and track) on a transmit power that enables them to communicate with the other UEs in the group. In general, the active (transmitting and/or receiving) group members may or may not be known to all UEs in the group. Specifically, the active group members may be known to all UEs in the group, as may be the case in a closed group. Alternatively, in the case of an open group, the active group members may not be known to all UEs in the group. As yet another alternative, the active group members may only be known to the group leader (i.e., one of the UEs in the sidelink communications group), which may be the case in open and closed groups.

The members of a sidelink communications group may join and exit the group at different times. If the group is a closed group (meaning the group members are known to all of the UEs in the group), a UE joining or exiting the group is signaled to the other members, and in response, the transmit power control for group communications among the updated group members can be re-evaluated.

Group communications among a sidelink communication group may employ only NACK feedback, or no HARQ feedback at all, as an ACK or NACK from each group member can utilize considerable resource overhead (particularly for large groups). In such cases, when a group member transmits a message to the other group members, it assumes that the message was received (unless it receives a NACK if NACK feedback is employed). Given that the group members have performed transmit power control procedures with the other members of the group, it is reasonable for them to assume that messages will be received by the other group members.

However, an issue with sidelink group communications using transmit power control is how to detect whether or not a group member is no longer able to receive messages from one or more of the other group members, as in the case where a member is suddenly blocked. For example, where the member UEs are using beamforming, to communicate with each other (as discussed above with reference to FIG. 5), a beam could become "blocked" due to UE mobility (e.g., moving behind an obstacle) or other environmental factors (e.g., high interference due to transmissions from a newly appearing device). This is a particular issue when there is no distinct ACK transmission from each group member for group communications. That is, because of the transmit power control procedure, a transmitting group member assumes that the other group members receive its messages without the need for an ACK, and this is usually the case. However, if a member is blocked from the transmitter, it will not receive group communications, and there will be no way for the blocked member to know that it has missed a message or to inform the transmitter that it has (e.g., via a NACK). Likewise, because the transmitter does not expect an ACK in response to its messages, it will not know that one of its messages was not received.

Accordingly, the present disclosure provides techniques to enable a group leader and/or a base station to detect whether or not all of the group member UEs are well-connected, and if not, trigger transmit power control and/or beam refinement or beam failure recover procedures for one or more of the group member UEs.

A UE participating in sidelink group communications with one or more other UEs transmits and/or receives sidelink transmissions to/from one or more other UEs in the group. To distinguish a transmission intended for the members of the sidelink communications group from non-group transmissions, a sidelink group transmission may include a group-specific destination identifier. For example, the group identifier may be a Layer 2 (i.e., access stratum layer) group identifier. The purpose of this group identifier is that a UE may be a member of multiple groups, and as such, needs to know with which group a particular message is associated. When a UE transmits a message destined for the sidelink communications group, it is expected/assumed to be received by all other members of the group.

In an aspect, each member of the group maintains a first transmit counter of the number of packets that that member UE transmits as a part of sidelink group communications (note that a group message may comprise one or more packets, depending on the type and size of the message). Each UE also maintains a set of receive counters, one counter per other group member UE, to track the number of packets received from each member UE. A group member may be identified using a UE-specific source identifier (e.g., a Layer 2 identifier), and each transmitting group member UE may include that identifier in the sidelink messages it transmits. In addition, as mentioned above, each transmission (and more specifically, each packet of each sidelink message) may include a group-specific destination identifier (e.g., a Layer 2 identifier), indicating that the transmission is intended for the sidelink communications group.

Each UE may periodically report the transmit and receive counters to a group leader UE for the sidelink communications group, or a base station (e.g., base station 102 in FIG. 1, ng-eNB 224 or gNB 222 in FIGS. 2A and 2B) serving the sidelink communications group, based on a configuration received from the group leader or the base station. Based on these counters, as described further below, a UE may receive a command from the group leader or base station to adjust its sidelink transmission. The commands may include a transmit power control command, a trigger to perform a beam refinement procedure, and/or a trigger to perform a beam failure recovery procedure.

In an aspect, the configuration indicating if or when to report the counters to the group leader or the base station may be a configuration to transmit periodically or based on certain events. If periodic reporting is configured, the configuration may indicate the periodicity of the reporting, the time offset of the reporting, and/or a time window within which the UE should attempt to transmit the counters. For example, the time window may be represented as (time_offset, time_offset+time wndow)+k*time_period. If event-based reporting is configured, the member UEs may be configured with counter thresholds indicating when to report the transmit and receive counters. For example, each member UE may be configured to report a counter when the value of that counter exceeds 10 counts. A UE may separately report a counter when its count reaches the threshold, or may report all counters together when at least one counter reaches the threshold. In addition, the count threshold may be different for different counters (e.g., the transmit counter may be associated with one threshold, and the receive counters may be associated with a different count threshold).

Based on the counters received from the different group member UEs, the group leader UE or the base station can determine whether or not a link between any two UEs in the sidelink communications group is no longer "closed" (i.e., the transmissions from at least one UE of a pair of UEs are not being received by the other UE of the pair). In that case, the group leader or base station can send a command to one or both of the UEs to "close" (i.e., reestablish) the link between them.

For example, if a particular sidelink between a first group member UE and a second group member UE is suddenly blocked, then at the next counter reporting period, the first UE will report that it transmitted 'N' packets to the second UE, while the second UE will report that it received less than 'N' packets from the first UE. The group leader or the base station can then send, for example, a transmit power control command to the first UE (and the second UE) to close the sidelink between them, or a command to trigger a beam failure recovery (BFR) procedure to establish a different beam pair between the UEs that may not be blocked.

The commands that the group leader or the base station may send to a pair of UEs include a transmit power control command, a command to reconfigure the QoS of the sidelink, an indication to perform a beam refinement procedure, an indication to preform a beam failure recovery procedure, or any combination thereof. In the case of a command to reconfigure the QoS of the sidelink, the UEs may then use a lower modulation and coding scheme (MCS) for transmissions over the sidelink. In an aspect, this may be done using an upper limit on the MCS that the UEs can use.

In an aspect, the transmissions to/from the group leader UE or the base station may always be associated with an ACK/NACK, regardless of whether or not the sidelink group communications use NACK-only feedback or no HARQ feedback at all. In this case, any commands from the group leader and the reporting of the counters to the group leader should be acknowledged (with either an ACK or a NACK). That is, a member UE should acknowledge a command from the group leader, and the group leader should acknowledge a counter report from a member UE.

Figure 6:
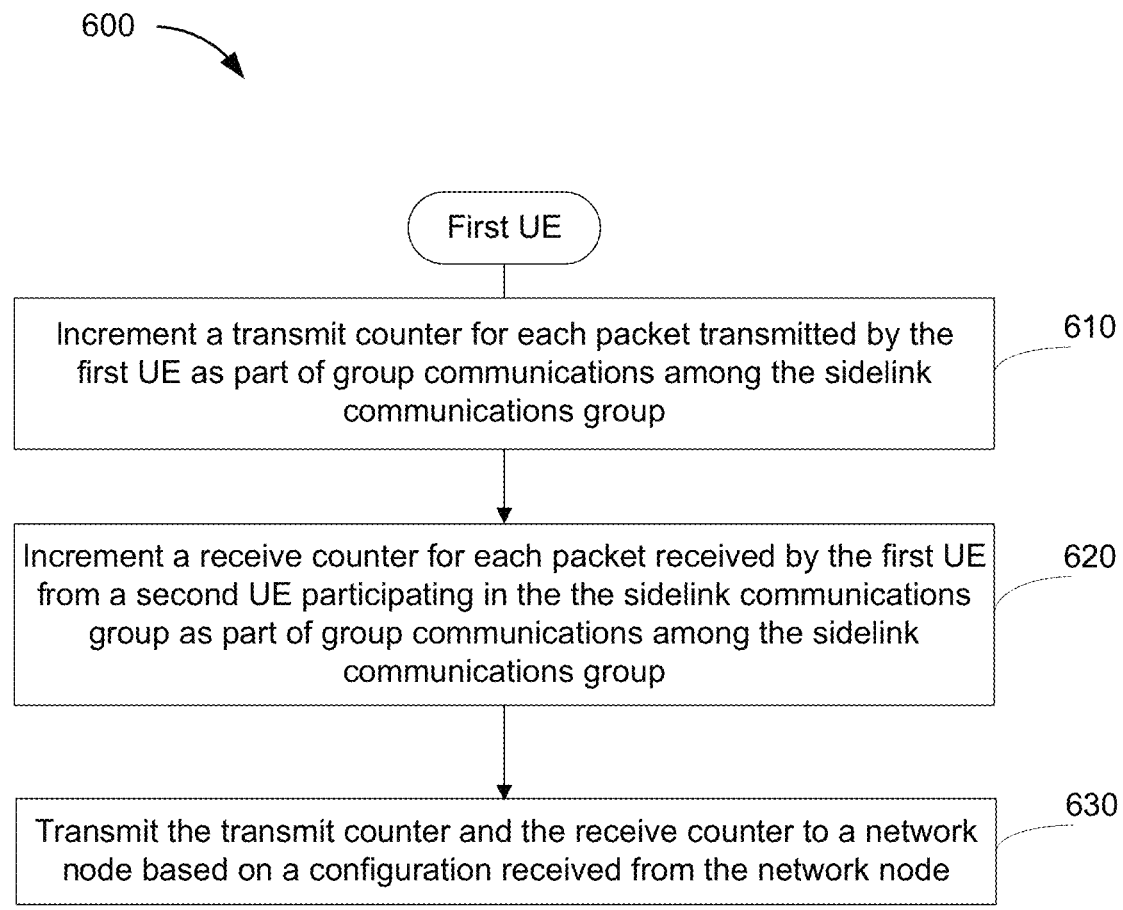
FIGS. 6 and 7 illustrate example methods for wireless communication, according to aspects of the disclosure.

FIG. 6 illustrates an example method 600 of wireless communication, according to aspects of the disclosure. In an aspect, method 600 may be performed by a UE participating in a sidelink communications group (e.g., any of the UEs described herein).

At 610, the first UE increments a transmit counter for each packet transmitted by the first UE as part of group communications among the sidelink communications group. In an aspect, operation 610 may be performed by the at least one WWAN transceiver 410, the at least one short-range wireless transceiver 420, the at least one processor 432, memory component 440, and/or sidelink manager 442, any or all of which may be considered means for performing this operation.

At 620, the first UE increments a receive counter for each packet received by the first UE from a second UE participating in the sidelink communications group as part of group communications among the sidelink communications group. In an aspect, operation 620 may be performed by the at least one WWAN transceiver 410, the at least one short-range wireless transceiver 420, the at least one processor 432, memory component 440, and/or sidelink manager 442, any or all of which may be considered means for performing this operation.

At 630, the first UE transmits the transmit counter and the receive counter to a network node (e.g., a group leader, such as UE any of the UEs described herein, or a base station serving one or more of the UEs of a sidelink communications group) based on a configuration received from the network node. In an aspect, operation 630 may be performed by the at least one WWAN transceiver 410, the at least one short-range wireless transceiver 420, the at least one processor 432, memory component 440, and/or sidelink manager 442, any or all of which may be considered means for performing this operation.

Figure 7:
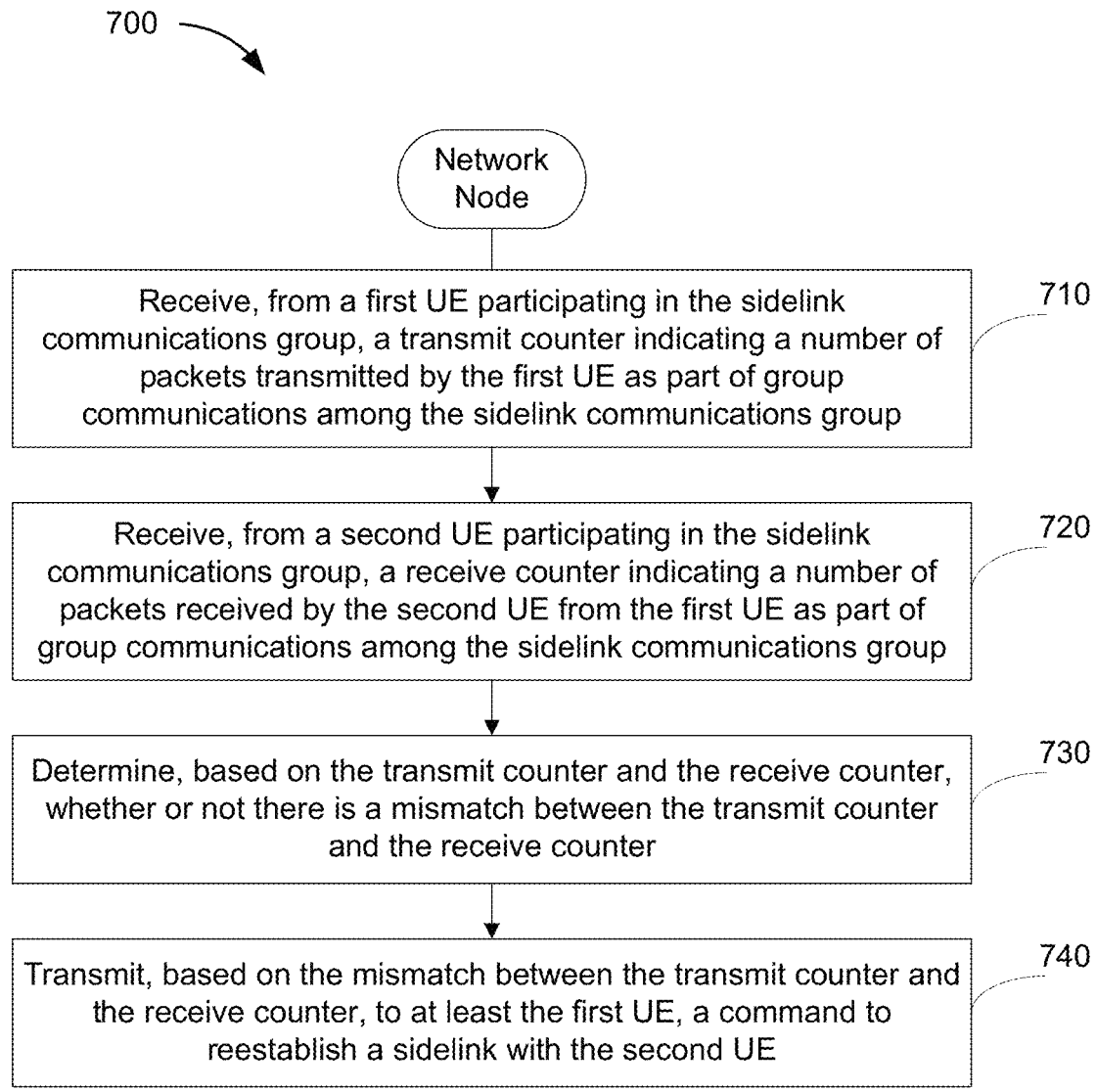

FIG. 7 illustrates an example method 700 for wireless communication, according to aspects of the disclosure. In an aspect, the method 700 may be performed by a network node associated with a sidelink communications group (e.g., a group leader, such as any of the UEs described herein, or a base station serving one or more of the UEs of a sidelink communications group).

At 710, the network node receives, from a first UE (e.g., any of the UEs described herein) participating in the sidelink communications group, a transmit counter indicating a number of packets transmitted by the first UE as part of group communications among the sidelink communications group. In an aspect, where the network node is a group leader UE, operation 710 may be performed by the at least one WWAN transceiver 410, the at least one short-range wireless transceiver 420, the at least one processor 432, memory component 440, and/or sidelink manager 442, any or all of which may be considered means for performing this operation. Similarly, where the network node is a base station, operation 710 may be performed by the at least one WWAN transceiver 450, the at least one short-range wireless transceiver 460, the at least one processor 484, memory component 486, and/or sidelink manager 488, any or all of which may be considered means for performing this operation.

At 720, the network node receives, from a second UE (e.g., any of the UEs described herein) participating in the sidelink communications group, a receive counter indicating a number of packets received by the second UE from the first UE as part of group communications among the sidelink communications group. In an aspect, where the network node is a group leader UE, operation 720 may be performed by the at least one WWAN transceiver 410, the at least one short-range wireless transceiver 420, the at least one processor 432, memory component 440, and/or sidelink manager 442, any or all of which may be considered means for performing this operation. Similarly, where the network node is a base station, operation 720 may be performed by the at least one WWAN transceiver 450, the at least one short-range wireless transceiver 460, the at least one processor 484, memory component 486, and/or sidelink manager 488, any or all of which may be considered means for performing this operation.

At 730, the network node determines, based on the transmit counter and the receive counter, whether or not there is a mismatch between the transmit counter and the receive counter. In an aspect, where the network node is a group leader UE, operation 730 may be performed by the at least one WWAN transceiver 410, the at least one short-range wireless transceiver 420, the at least one processor 432, memory component 440, and/or sidelink manager 442, any or all of which may be considered means for performing this operation. Similarly, where the network node is a base station, operation 730 may be performed by the at least one WWAN transceiver 450, the at least one short-range wireless transceiver 460, the at least one processor 484, memory component 486, and/or sidelink manager 488, any or all of which may be considered means for performing this operation.

At 740, the network node transmits, based on the mismatch between the transmit counter and the receive counter, to at least the first UE, a command to reestablish a sidelink with the second UE. In an aspect, where the network node is a group leader UE, operation 740 may be performed by the at least one WWAN transceiver 410, the at least one short-range wireless transceiver 420, the at least one processor 432, memory component 440, and/or sidelink manager 442, any or all of which may be considered means for performing this operation. Similarly, where the network node is a base station, operation 740 may be performed by the at least one WWAN transceiver 450, the at least one short-range wireless transceiver 460, the at least one processor 484, memory component 486, and/or sidelink manager 488, any or all of which may be considered means for performing this operation.

As will be appreciated, a technical advantage of the methods 600 and 700 is determining whether or not a link between any two UEs in the sidelink communications group is no longer "closed."

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method for wireless communication performed by a first user equipment (UE) participating in a sidelink communications group, comprising: incrementing a transmit counter for each packet transmitted by the first UE as part of group communications among the sidelink communications group; incrementing a receive counter for each packet received by the first UE from a second UE participating in the sidelink communications group as part of group communications among the sidelink communications group; and transmitting the transmit counter and the receive counter to a network node based on a configuration received from the network node.

Clause 2. The method of clause 1, wherein the first UE increments a receive counter maintained for each member of the sidelink communications group in response to receiving a packet from that UE.

Clause 3. The method of any of clauses 1 to 2, wherein the configuration specifies a periodicity at which to transmit the transmit counter and the receive counter, a time offset at which to transmit the transmit counter and the receive counter, and/or a time window within which to transmit the transmit counter and the receive counter.

Clause 4. The method of any of clauses 1 to 3, wherein the configuration specifies at least one count threshold for the transmit counter and the receive counter.

Clause 5. The method of clause 4, wherein the at least one count threshold is a single count threshold that applies to both the transmit counter and the receive counter.

Clause 6. The method of any of clauses 4 to 5, wherein the at least one count threshold comprises separate count threshold for the transmit counter and the receive counter.

Clause 7. The method of any of clauses 1 to 6, further comprising: receiving, from the network node, a command to reestablish a sidelink with the second UE.

Clause 8. The method of clause 7, wherein the command comprises: a transmit power control command, a command to reconfigure a quality of service (QoS) of the sidelink, a command to perform a beam refinement procedure with the second UE, a command to perform a beam failure procedure with the second UE, or any combination thereof.

Clause 9. The method of clause 8, wherein the command to reconfigure the QoS of the sidelink includes an upper limit on a modulation and coding scheme (MCS) that the first UE can use for transmissions over the sidelink.

Clause 10. The method of any of clauses 7 to 9, further comprising: transmitting an acknowledgment to the network node in response to reception of the command.

Clause 11. The method of any of clauses 7 to 10, wherein the first UE receives the command based on the transmit counter and the receive counter indicating a failure of the sidelink between the first UE and the second UE.

Clause 12. The method of any of clauses 1 to 11, further comprising: receiving, from the network node, an acknowledgment of transmission of the transmit counter and the receive counter.

Clause 13. The method of any of clauses 1 to 12, wherein the network node comprises a base station serving the first UE and the second UE.

Clause 14. The method of any of clauses 1 to 12, wherein the network node comprises a group leader UE of the sidelink communications group.

Clause 15. A method for wireless communication performed by a network node associated with a sidelink communications group, comprising: receiving, from a first UE participating in the sidelink communications group, a transmit counter indicating a number of packets transmitted by the first UE as part of group communications among the sidelink communications group; receiving, from a second UE participating in the sidelink communications group, a receive counter indicating a number of packets received by the second UE from the first UE as part of group communications among the sidelink communications group; determining, based on the transmit counter and the receive counter, whether or not there is a mismatch between the transmit counter and the receive counter; and based on the mismatch between the transmit counter and the receive counter, transmitting, to at least the first UE, a command to reestablish a sidelink with the second UE.

Clause 16. The method of clause 15, wherein: the network node receives a transmit counter from each member of the sidelink communications group, and the network node receives a receive counter from each member of the sidelink communications group.

Clause 17. The method of any of clauses 15 to 16, further comprising: transmitting a configuration for the transmit counter to the first UE; and transmitting a configuration for the receive counter to the second UE.

Clause 18. The method of clause 17, wherein: the configuration for the transmit counter specifies a periodicity at which to transmit the transmit counter, a time offset at which to transmit the transmit counter, and/or a time window within which to transmit the transmit counter, and the configuration for the receive counter specifies a periodicity at which to transmit the receive counter, a time offset at which to transmit the receive counter, and/or a time window within which to transmit the receive counter.

Clause 19. The method of any of clauses 17 to 18, wherein: the configuration for the transmit counter specifies a count threshold for the transmit counter, and the configuration for the receive counter specifies a count threshold for the receive counter.

Clause 20. The method of clause 19, wherein the count threshold for the transmit counter is the same as the count threshold for the receive counter.

Clause 21. The method of any of clauses 15 to 20, wherein the command comprises: a transmit power control command, a command to reconfigure a quality of service (QoS) of a sidelink between the first UE and the second UE, a command to perform a beam refinement procedure with the second UE, a command to perform a beam failure procedure with the second UE, or any combination thereof.

Clause 22. The method of clause 21, wherein the command to reconfigure the QoS of the sidelink includes an upper limit on a modulation and coding scheme (MCS) that the first UE can use for transmissions over the sidelink.

Clause 23. The method of any of clauses 15 to 22, further comprising: receiving an acknowledgment from at least the first UE in response to transmission of the command.

Clause 24. The method of any of clauses 15 to 23, further comprising: transmitting, to the first UE, an acknowledgment of reception of the transmit counter; and transmitting, to the second UE, an acknowledgment of reception of the receive counter.

Clause 25. The method of any of clauses 15 to 24, further comprising: receiving, from the second UE, a second transmit counter indicating a number of packets transmitted by the second UE as part of group communications among the sidelink communications group; and receiving, from the first UE, a second receive counter indicating a number of packets received by the first UE from the second UE as part of group communications among the sidelink communications group.

Clause 26. The method of clause 25, wherein the determination is further based on a mismatch between the second transmit counter and the second receive counter.

Clause 27. The method of any of clauses 15 to 26, wherein the network node comprises a base station serving the first UE and the second UE.

Clause 28. The method of any of clauses 15 to 26, wherein the network node comprises a group leader UE of the sidelink communications group.

Clause 29. A first user equipment (UE), comprising: a memory; a communication interface; and at least one processor communicatively coupled to the memory and the communication interface, the at least one processor configured to: increment a transmit counter for each packet transmitted by the first UE as part of group communications among the sidelink communications group; increment a receive counter for each packet received by the first UE from a second UE participating in the sidelink communications group as part of group communications among the sidelink communications group; and cause the communication interface to transmit the transmit counter and the receive counter to a network node based on a configuration received from the network node.

Clause 30. The first UE of clause 29, wherein the first UE increments a receive counter maintained for each member of the sidelink communications group in response to receiving a packet from that UE.

Clause 31. The first UE of any of clauses 29 to 30, wherein the configuration specifies a periodicity at which to transmit the transmit counter and the receive counter, a time offset at which to transmit the transmit counter and the receive counter, and/or a time window within which to transmit the transmit counter and the receive counter.

Clause 32. The first UE of any of clauses 29 to 31, wherein the configuration specifies at least one count threshold for the transmit counter and the receive counter.

Clause 33. The first UE of clause 32, wherein the at least one count threshold is a single count threshold that applies to both the transmit counter and the receive counter.

Clause 34. The first UE of any of clauses 32 to 33, wherein the at least one count comprises separate count threshold for the transmit counter and the receive counter.

Clause 35. The first UE of any of clauses 29 to 34, wherein the at least one processor is further configured to: receive, via the communication interface, from the network node, a command to reestablish a sidelink with the second UE.

Clause 36. The first UE of clause 35, wherein the command comprises: a transmit power control command, a command to reconfigure a quality of service (QoS) of the sidelink, a command to perform a beam refinement procedure with the second UE, a command to perform a beam failure procedure with the second UE, or any combination thereof.

Clause 37. The first UE of clause 36, wherein the command to reconfigure the QoS of the sidelink includes an upper limit on a modulation and coding scheme (MCS) that the first UE can use for transmissions over the sidelink.

Clause 38. The first UE of any of clauses 35 to 37, wherein the at least one processor is further configured to: cause the communication interface to transmit an acknowledgment to the network node in response to reception of the command.

Clause 39. The first UE of any of clauses 35 to 38, wherein the first UE receives the command based on the transmit counter and the receive counter indicating a failure of the sidelink between the first UE and the second UE.

Clause 40. The first UE of any of clauses 29 to 39, wherein the at least one processor is further configured to: receive, via the communication interface, from the network node, an acknowledgment of transmission of the transmit counter and the receive counter.

Clause 41. The first UE of any of clauses 29 to 40, wherein the network node comprises a base station serving the first UE and the second UE.

Clause 42. The first UE of any of clauses 29 to 40, wherein the network node comprises a group leader UE of the sidelink communications group.

Clause 43. A network node, comprising: a memory; a communication interface; and at least one processor communicatively coupled to the memory and the communication interface, the at least one processor configured to: receive, via the communication interface, from a first UE participating in the sidelink communications group, a transmit counter indicating a number of packets transmitted by the first UE as part of group communications among the sidelink communications group; receive, via the communication interface, from a second UE participating in the sidelink communications group, a receive counter indicating a number of packets received by the second UE from the first UE as part of group communications among the sidelink communications group; determine, based on the transmit counter and the receive counter, whether or not there is a mismatch between the transmit counter and the receive counter; and cause the communication interface to transmit, to at least the first UE, based on the mismatch between the transmit counter and the receive counter, a command to reestablish a sidelink with the second UE.

Clause 44. The network node of clause 43, wherein: the network node receives a transmit counter from each member of the sidelink communications group, and the network node receives a receive counter from each member of the sidelink communications group.

Clause 45. The network node of any of clauses 43 to 44, wherein the at least one processor is further configured to: cause the communication interface to transmit a configuration for the transmit counter to the first UE; and cause the communication interface to transmit a configuration for the receive counter to the second UE.

Clause 46. The network node of clause 45, wherein: the configuration for the transmit counter specifies a periodicity at which to transmit the transmit counter, a time offset at which to transmit the transmit counter, and/or a time window within which to transmit the transmit counter, and the configuration for the receive counter specifies a periodicity at which to transmit the receive counter, a time offset at which to transmit the receive counter, and/or a time window within which to transmit the receive counter.

Clause 47. The network node of any of clauses 45 to 46, wherein: the configuration for the transmit counter specifies a count threshold for the transmit counter, and the configuration for the receive counter specifies a count threshold for the receive counter.

Clause 48. The network node of clause 47, wherein the count threshold for the transmit counter is the same as the count threshold for the receive counter.

Clause 49. The network node of any of clauses 43 to 48, wherein the command comprises:

a transmit power control command, a command to reconfigure a quality of service (QoS) of a sidelink between the first UE and the second UE, a command to perform a beam refinement procedure with the second UE, a command to perform a beam failure procedure with the second UE, or any combination thereof.

Clause 50. The network node of clause 49, wherein the command to reconfigure the QoS of the sidelink includes an upper limit on a modulation and coding scheme (MCS) that the first UE can use for transmissions over the sidelink.

Clause 51. The network node of any of clauses 43 to 50, wherein the at least one processor is further configured to: receive, via the communication interface, an acknowledgment from at least the first UE in response to transmission of the command.

Clause 52. The network node of any of clauses 43 to 51, wherein the at least one processor is further configured to: cause the communication interface to transmit, to the first UE, an acknowledgment of reception of the transmit counter; and cause the communication interface to transmit, to the second UE, an acknowledgment of reception of the receive counter.

Clause 53. The network node of any of clauses 43 to 52, wherein the at least one processor is further configured to: receive, via the communication interface, from the second UE, a second transmit counter indicating a number of packets transmitted by the second UE as part of group communications among the sidelink communications group; and receive, via the communication interface, from the first UE, a second receive counter indicating a number of packets received by the first UE from the second UE as part of group communications among the sidelink communications group.

Clause 54. The network node of clause 53, wherein the determination is further based on a mismatch between the second transmit counter and the second receive counter.

Clause 55. The network node of any of clauses 43 to 54, wherein the network node comprises a base station serving the first UE and the second UE.

Clause 56. The network node of any of clauses 43 to 54, wherein the network node comprises a group leader UE of the sidelink communications group.

Clause 57. An apparatus comprising means for performing a method according to any of clauses 1 to 28.

Clause 58. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed:

1. A method for wireless communication performed by a first user equipment (UE) participating in a sidelink communications group, comprising:
   transmitting one or more packets as part of group communications among the sidelink communications group;
   incrementing a transmit counter for each packet transmitted by the first UE as part of the group communications among the sidelink communications group;
   receiving one or more packets from a second UE participating in the sidelink communications group as part of the group communications among the sidelink communications group;
   incrementing a receive counter for each packet received by the first UE from the second UE participating in the sidelink communications group as part of the group communications among the sidelink communications group;
   transmitting the transmit counter and the receive counter to a network node based on a configuration received from the network node; and
   receiving, from the network node, a command to reestablish a sidelink with the second UE.

2. The method of claim 1, wherein the first UE increments a receive counter maintained for each member of the sidelink communications group in response to receiving a packet from that UE.

3. The method of claim 1, wherein the configuration specifies a periodicity at which to transmit the transmit counter and the receive counter, a time offset at which to transmit the transmit counter and the receive counter, and/or a time window within which to transmit the transmit counter and the receive counter.

4. The method of claim 1, wherein the configuration specifies at least one count threshold for the transmit counter and the receive counter.

5. The method of claim 4, wherein the at least one count threshold is a single count threshold that applies to both the transmit counter and the receive counter.

6. The method of claim 4, wherein the at least one count threshold comprises separate count threshold for the transmit counter and the receive counter.

7. The method of claim 1, wherein the command comprises:
   a transmit power control command,
   a command to reconfigure a quality of service (QoS) of the sidelink,
   a command to perform a beam refinement procedure with the second UE,
   a command to perform a beam failure procedure with the second UE,
   or any combination thereof.

8. The method of claim 7, wherein the command to reconfigure the QoS of the sidelink includes an upper limit on a modulation and coding scheme (MCS) that the first UE can use for transmissions over the sidelink.

9. The method of claim 1, further comprising:
   transmitting an acknowledgment to the network node in response to reception of the command.

10. The method of claim 1, wherein the first UE receives the command based on the transmit counter and the receive counter indicating a failure of the sidelink between the first UE and the second UE.

11. The method of claim 1, further comprising:
receiving, from the network node, an acknowledgment of transmission of the transmit counter and the receive counter.

12. The method of claim 1, wherein the network node comprises a base station serving the first UE and the second UE.

13. The method of claim 1, wherein the network node comprises a group leader UE of the sidelink communications group.

14. A first user equipment (UE), comprising:
a memory;
a communication interface; and
at least one processor communicatively coupled to the memory and the communication interface, the at least one processor configured to:
 cause the communication interface to transmit one or more packets as part of group communications among the sidelink communications group;
 increment a transmit counter for each packet transmitted by the first UE as part of the group communications among a sidelink communications group;
 receive, via the communication interface, one or more packets from a second UE participating in the sidelink communications group as part of the group communications among the sidelink communications group;
 increment a receive counter for each packet received by the first UE from the second UE participating in the sidelink communications group as part of the group communications among the sidelink communications group;
 cause the communication interface to transmit the transmit counter and the receive counter to a network node based on a configuration received from the network node; and
 receive, via the communication interface, from the network node, a command to reestablish a sidelink with the second UE.

* * * * *